United States Patent [19]

Gilg et al.

[11] Patent Number: 5,772,921
[45] Date of Patent: Jun. 30, 1998

[54] SYNERGISTIC MIXTURE CONSISTING OF A 2,4-DIMETHYL-6-S-ALKYLPHENOL AND A STERICALLY HINDERED PHENOL

[75] Inventors: Bernard Gilg, St. Louis-la-Chaussée, France; Kurt Stinsky, Basel, Switzerland

[73] Assignee: Ciba Specialty Chemicals Corporation, Tarrytown, N.Y.

[21] Appl. No.: 789,898

[22] Filed: Jan. 29, 1997

[30] Foreign Application Priority Data

Jan. 31, 1996 [CH] Switzerland ............... 249/96

[51] Int. Cl.⁶ .......... C09K 15/08; C09K 15/22; C09K 15/32
[52] U.S. Cl. .......... 252/404; 252/403; 252/400.2
[58] Field of Search .......... 252/404, 403, 252/400.2

[56] References Cited

U.S. PATENT DOCUMENTS

| | | | |
|---|---|---|---|
| 3,511,802 | 5/1970 | Newland et al. | 260/41 |
| 3,644,482 | 2/1972 | Dexter et al. | 260/473 |
| 3,681,417 | 8/1972 | Simons | 260/430 |
| 3,944,594 | 3/1976 | Kleiner et al. | 260/473 |
| 4,009,227 | 2/1977 | Ott et al. | 260/876 |
| 5,086,173 | 2/1992 | Tritschler et al. | 544/211 |
| 5,098,945 | 3/1992 | Pitteloud et al. | 524/349 |

FOREIGN PATENT DOCUMENTS 0843985  6/1970  Canada.

OTHER PUBLICATIONS

Chemical Abstract—72:11860t.
Rubber Chemistry and Technology 47 (1974), No. 4, pp. 988 & 989.
Chemical Abstract—69:10147s.
G. Scott, Atmospheric Oxidation and Antioxidants (1965), pp. 120–125.

*Primary Examiner*—Kriellion S. Morgan
*Attorney, Agent, or Firm*—Luther A. R. Hall; Victoria M. Malia; David R. Crichton

[57] ABSTRACT

The present invention relates to synergistic mixtures of at least one 2,4-dimethyl-6-s-alkyl phenol and at least one selected sterically hindered phenol according to formula II

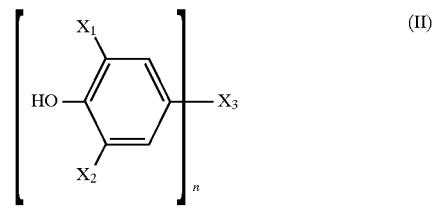

The variable "n" is 1, 2 or 4. $X_1$ is tert-butyl. $X_2$ is $C_1$–$C_4$alkyl. $X_3$, when n is 1, is $C_1$–$C_{20}$alkyl, a triazinylamino group, or a —$A_1$—COO—$A_2$ or —$A_1$—CONH—$A_2$ group. $X_3$, when n is 2, is a —$E_1$—COO—$E_2$—OOC—$E_3$— or —$E_1$—CONH—$E_2$—NHCO—$E_3$— group. $X_3$, when n is 4, is [—$G_1$—COO]$_4$—$G_2$. The instant synergistic mixtures can be used to stabilize selected organic polymers against thermal, oxidative and/or actinic degradation.

9 Claims, No Drawings

SYNERGISTIC MIXTURE CONSISTING OF A 2,4-DIMETHYL-6-S-ALKYLPHENOL AND A STERICALLY HINDERED PHENOL

The present invention relates to a synergistic mixture consisting of a 2,4-dimethyl-6-s-alkylphenol and a sterically hindered phenol, to the use of said mixture as well as to selected organic polymers, e.g. an acrylonitrile/butadiene/styrene terpolymer (ABS) or a styrene/acrylonitrile copolymer (SAN), which are stabilised with said novel mixture against thermal, oxidative and/or actinic degradation.

A number of trialkylphenols, for example 2,6-di-tert-butyl-4-methylphenol and 2,4-dimethyl-6-(1-methylpentadecyl)phenol (U.S. Pat. No. 5,098,945), and their use for stabilising organic materials are known, and the stabilising action of sterically hindered phenols is also described, inter alia, in U.S. Pat. No. 3,944,594, U.S. Pat. No. 3,644,482, U.S. Pat. No. 5,086,173, U.S. Pat. No. 3,644,482, CA 843 985, U.S. Pat. No. 3,681,417.

In "Atmospheric Oxidation and Antioxidants"; Elsevier Publishing Company (1965), pages 120–125, G. Scott describes the connection between stabilising action and substitution at the phenol for mineral oils. U.S. Pat. No. 3,511,802 discloses the stabilisation of polypropylene resins with alkyl-substituted phenols. The preparation as well as the spectra of secondary alkylphenols are given in Chemical Abstracts 69:10147s and 72:11860t.

"Rubber Chemistry and Technology" 47 (1974), No. 4, pages 988 and 989, describes the mode of action of antioxidants.

The invention relates to a mixture, comprising a) at least one compound of formua I

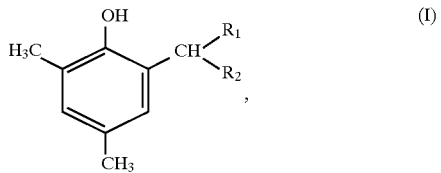

wherein $R_1$ is methyl or ethyl, and $R_2$ is $C_{10}$–$C_{30}$alkyl, and b) at least one compound of formula II

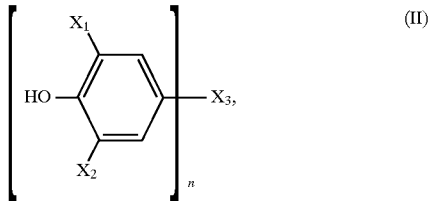

wherein n is 1, 2 or 4, $X_1$ is tert-butyl, $X_2$ is $C_1$–$C_4$alkyl, $X_3$, where n=1, is $C_1$–$C_{20}$alkyl, a triazinylamino group which is substituted at the triazine ring by $C_1$–$C_{10}$alkylthio, or a —$A_1$—COO—$A_2$ or —$A_1$—CONH—$A_2$ group, wherein $A_1$ is either a direct bond or $C_1$–$C_4$alkylene, and $A_2$ is $C_1$–$C_{20}$alkyl; $C_4$–$C_{20}$alkyl which is interrupted by —O—; $C_5$–$C_{12}$cycloalkyl; phenyl; phenyl which is substituted by —OH and/or $C_1$–$C_4$alkyl; $C_7$–$C_9$phenylalkyl; $C_7$–$C_9$phenylalkyl which is substituted at the phenyl moiety by —OH and/or $C_1$–$C_4$alkyl, $X_3$, where n=2, is a —$E_1$—COO—$E_2$—OOC—$E_3$— or —$E_1$—CONH—$E_2$—NHCO—$E_3$— group, wherein $E_1$ and $E_3$ are each independently of the other a direct bond or $C_1$–$C_4$alkylene, $E_2$ is $C_2$–$C_{20}$alkylene; $C_4$–$C_{20}$alkylene which is interrupted by —O— or —S—; a

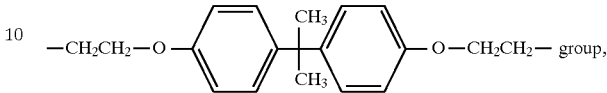

$C_5$–$C_7$cycloalkylene; $C_1$–$C_4$alkyl-substituted $C_5$–$C_7$cycloalkylene, phenylene or a

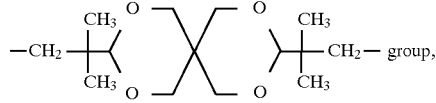

or $X_3$, where n=4, is [—$G_1$—COO]$_4$—$G_2$, wherein $G_1$ is a direct bond or $C_1$–$C_4$alkylene, and $G_2$ is $C_5$–$C_{10}$alkanetetrayl.

Alkyl containing up to 30 carbon atoms is a branched or straight-chain radical, typically methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl or triacontyl.

One of the preferred meanings of $R_2$ is, for example, $C_{10}$–$C_{25}$alkyl, preferably $C_{10}$–$C_{20}$alkyl or $C_{10}$–$C_{18}$alkyl.

A particularly preferred meaning of $R_2$ is $C_{12}$–$C_{16}$alkyl.

$X_2$ is typically methyl, ethyl, propyl, isopropyl, n-butyl, sec-butyl or tert-butyl.

A preferred meaning of $X_2$ is methyl and tert-butyl. Tert-butyl is particularly preferred.

One of the preferred meanings of $X_3$ is, for example, $C_1$–$C_{15}$alkyl, in particular $C_1$–$C_{10}$alkyl or $C_1$–$C_5$alkyl.

A particularly preferred meaning of $X_3$ is methyl.

One of the preferred meanings of $A_2$ is, for example, $C_5$–$C_{19}$alkyl, in particular $C_{10}$–$C_{18}$alkyl. A particularly preferred meaning of $A_2$ is $C_{18}$alkyl.

Alkyl containing 4 up to 20 carbon atoms and which is interrupted by —O— is a radical, typically $CH_3$—O—$CH_2CH_2$—O—$CH_2$—, $CH_3$—[O—$CH_2CH_2$—]$_2$O—$CH_2$—, $CH_3$—[O—$CH_2CH_2$—]$_3$O—$CH_2$— or $CH_3$—[O—$CH_2CH_2$—]$_4$O—$CH_2$—, and the like.

Cycloalkyl containing 5 to 12 carbon atoms is typically cyclopentyl, cyclohexyl, cycloheptyl, cyclooctylene, cyclononyl, cyclodecyl, cycloundecyl, or cyclododecyl. $C_5$–$C_8$Cycloalkyl and, in particular, cyclohexyl are preferred.

$C_1$–$C_4$Alkyl-substituted phenyl typically includes methylphenyl (tolyl), dimethylphenyl (xylyl), trimethylphenyl (mesityl), ethylphenyl, propylphenyl, butylphenyl. Where appropriate, these radicals can additionally contain an OH group as substituent in one of the possible positions.

$C_7$–$C_9$Phenylalkyl which is unsubstituted or substituted at the phenyl ring by 1 to 3 radicals and which preferably contains 1 or 2 branched or straight-chain $C_1$–$C_4$alkyl moieties and/or optionally a HO moiety, is typically benzyl, α-methylbenzyl, α,α-dimethylbenzyl or 2-phenylethyl, 2-methylbenzyl, 3-methylbenzyl, 4-methylbenzyl, 2,4-dimethylbenzyl, 2,6-dimethylbenzyl, 4-tert-butylbenzyl, 2-hydroxybenzyl, 3-hydroxybenzyl, 4-hydroxybenzyl, 2-hydroxy-4-methylbenzyl, 4-hydroxy-2-methylbenzyl, 4-hydroxy-2,6-dimethylbenzyl. Benzyl and α,α-dimethylbenzyl are preferred.

Alkylene containing up to 20 carbon atoms is a branched or straight-chain radical such as methylene, ethylene, propylene, isopropylene, n-butylene, sec-butylene, pentamethylene, hexamethylene, heptamethylene, octamethylene, decamethylene, dodecamethylene, octadecamethylene or eicosamethylene.

A preferred meaning of $A_1$ is ethylene.

Preferred meanings of $E_2$ are $C_2$–$C_{15}$alkylene, in particular $C_2$–$C_{10}$alkylene, e.g. hexamethylene.

$C_4$–$C_{20}$Alkylene which is interrupted by —O— or —S— is typically —$CH_2$—O—$CH_2CH_2$—O—$CH_2$—, —$CH_2$—O—$CH_2CH_2$—]$_2$O —$CH_2$—, —$CH_2$—[O—$CH_2CH_2$—]$_3$O—$CH_2$—, —$CH_2$—[O—$CH_2CH_2$—]$_4$O—$CH_2$— or —$CH_2CH_2$—S—$CH_2CH_2$—, and the like.

A preferred meaning of $E_2$ is —$CH_2CH_2$—O—$CH_2CH_2$—O—$CH_2CH_2$— or —$CH_2CH_2$—S—$CH_2CH_2$—.

$C_5$–$C_7$Cycloalkylene is cyclopentylene, cyclohexylene or cycloheptylene. Cyclohexylene is preferred.

$C_1$–$C_4$Alkyl-substituted $C_5$–$C_7$cycloalkylene is typically

Typical examples of a triazinylamino group, which is substituted at the triazine ring by $C_1$–$C_{10}$alkylthio, are:

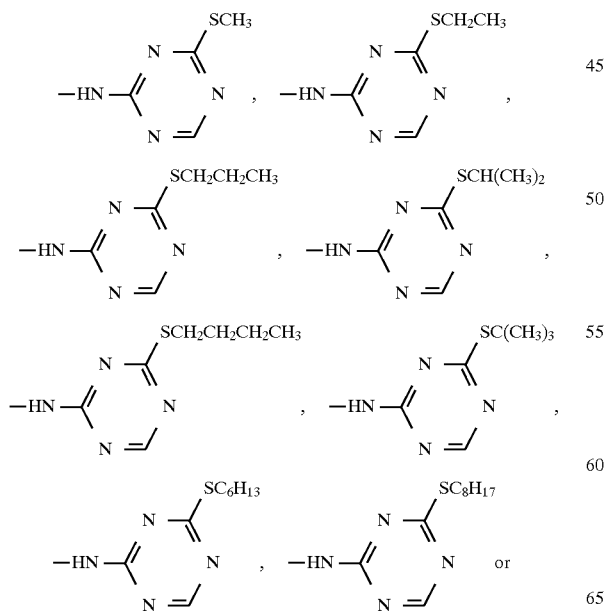

The triazine ring is preferably substituted by 2 $C_1$–$C_{10}$alkylthio groups.

The following alkylthiotriazinylamino group is preferred:

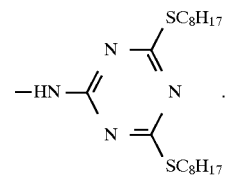

A particularly preferred meaning of $X_3$ is the —$A_1$—COO—$A_2$ group. A preferred meaning of $X_3$, where n=2, is the —$E_1$—COO—$E_2$—OOC—$E_3$— group, wherein $E_1$ and $E_3$ are preferably ethylene, and $E_2$ is hexamethylene or the

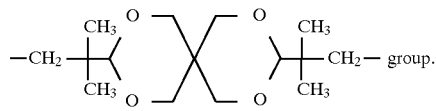

group.

$C_5$–$C_{10}$Alkanetetrayl is typically

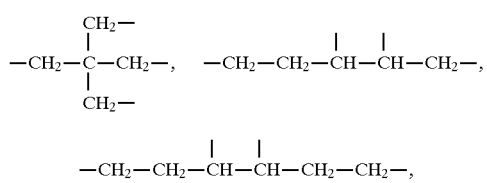

A preferred meaning of $X_3$, where n=4, is [—$CH_2CH_2COO$—$CH_2$—]$_4$C.

An important mixture is that comprising a) a mixture of the compounds Ia and Ib,

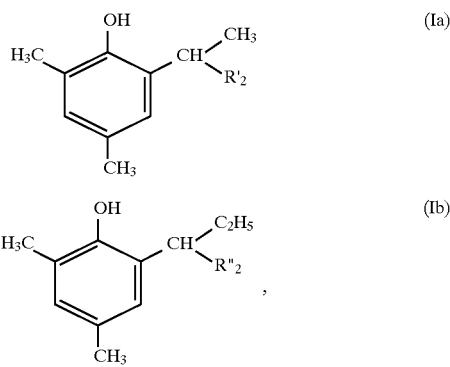

wherein $R_2'$ is —$C_mH_{2m+1}$ and $R_2''$ is —$C_{m-1}H_{2m-1}$, and m is an integer from 10 to 30, preferably from 10 to 20 and, particularly preferably, from 12 to 16, which is identical in $R_2'$ and $R_2''$, and b) at least a compound of formula II

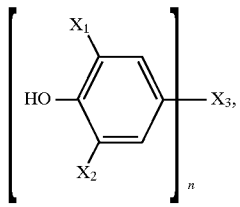

(II)

wherein n is 1, 2 or 4, $X_1$ is tert-butyl, $X_2$ is $C_1$–$C_4$alkyl, $X_3$, where n=1, is $C_1$–$C_{10}$alkyl, a triazinylamino group which is substituted at the triazine ring by $C_1$–$C_{10}$alkylthio, or a —$A_1$—COO—$A_2$ group, wherein $A_1$ is $C_1$–$C_4$alkylene, and $A_2$ is $C_1$–$C_{20}$alkyl, $X_3$, where n=2, is a —$E_1$—COO—$E_2$—OOC—$E_3$— group, wherein $E_1$ and $E_3$ are $C_1$–$C_4$alkylene, $E_2$ is $C_2$–$C_{20}$alkylene; $C_4$–$C_{20}$alkylene which is interrupted by —O— or —S—, or a

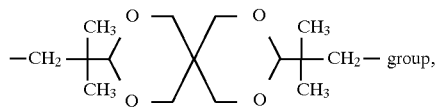

or $X_3$, where n=4, is [—$G_1$—COO]$_4$—$G_2$, wherein $G_1$ is $C_1$–$C_4$alkylene, and $G_2$ is $C_5$–$C_{10}$alkanetetrayl.

The weight ratio of the compounds (Ia)/(Ib) is typically from 1/99 to 99/1, preferably from 99/1 to 70/30 and, particularly preferably, from 95/5 to 80/20.

A particularly important component a) is a mixture of the compounds

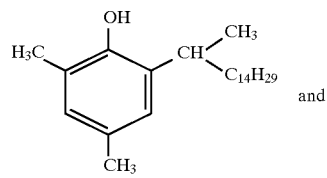

(Ic)

and

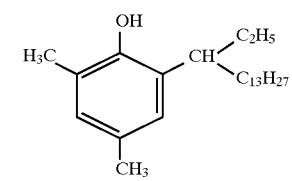

(Id)

A preferred sterically hindered phenol is that of formula II, wherein $X_3$, where n=1, is $C_1$–$C_4$alkyl or a —$A_1$—COO—$A_2$ group, wherein $A_1$ is $C_2$alkylene, and $A_2$ is $C_{10}$–$C_{20}$alkyl, or $X_3$, where n=2, is a —$E_1$—COO—$E_2$—OOC—$E_3$— group, wherein $E_1$ and $E_3$ are $C_2$alkylene, and $E_2$ is $C_6$alkylene which is interrupted by —O—, or $X_3$, where n=4, is [—$G_1$—COO]$_4$—$G_2$, wherein $G_1$ is $C_2$alkylene, and $G_2$ is $C_5$alkanetetrayl.

A very particularly interesting mixture is that comprising a) the mixture of the compounds

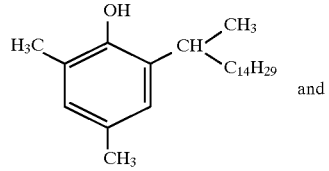

(Ic)

and

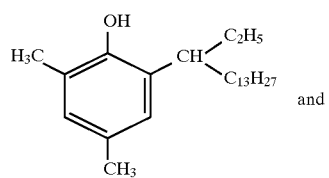

(Id)

b) at least one compound of formula II

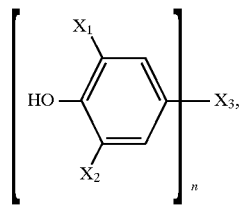

(II)

wherein n=1, $X_1$ and $X_2$ are tert-butyl, and $X_3$ is a —$A_1$—COO—$A_2$ group, wherein $A_1$ is $C_2$alkylene, and $A_2$ is $C_{18}$alkyl.

Also of interest are those compositions which contain as component A an organic material which is susceptible to thermal, oxidative or actinic degradation, and as component B a novel mixture of the compounds of formulae I and II.

Illustrative examples of component A are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyis and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidenenorbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).
17. Polyureas, polyimides, polyamide-imides, polyetherimids, polyesterimids, polyhydantoins and polybenzimidazoles.
18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.
19. Polycarbonates and polyester carbonates.
20. Polysulfones, polyether sulfones and polyether ketones.
21. Crosslinked polymers derived from aldehydes on the one hand and phenols, ureas and melamines on the other hand, such as phenol/formaldehyde resins, urea/formaldehyde resins and melamine/formaldehyde resins.
22. Drying and non-drying alkyd resins.
23. Unsaturated polyester resins derived from copolyesters of saturated and unsaturated dicarboxylic acids with polyhydric alcohols and vinyl compounds as crosslinking agents, and also halogen-containing modifications thereof of low flammability.
24. Crosslinkable acrylic resins derived from substituted acrylates, for example epoxy acrylates, urethane acrylates or polyester acrylates.
25. Alkyd resins, polyester resins and acrylate resins crosslinked with melamine resins, urea resins, isocyanates, isocyanurates, polyisocyanates or epoxy resins.
26. Crosslinked epoxy resins derived from aliphatic, cycloaliphatic, heterocyclic or aromatic glycidyl compounds, e.g. products of diglycidyl ethers of bisphenol A and bisphenolF, which are crosslinked with customary hardeners such as anhydrides or amines, with or without accelerators.
27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.
28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.
29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.
30. Aqueous emulsions of natural or synthetic rubber, e.g. natural latex or latices of carboxylated styrene/butadiene copolymers.

The novel mixture of formulae I and II or Ia, Ib (or Ic, Id) and II is normally added to the material to be stabilised in amounts of 0.01 to 10%, preferably of 0.05 to 5%, more preferably of 0.1 to 2%, based on the total weight of the material to be stabilised.

The weight ratio of the compounds (I)/(II) or (Ia and Ib)/II is typically from 20/1 to 1/20, preferably from 10/1 to 1/10, more preferably from 4/1 to 1/4, e.g. from 4/1 to 2/1.

The incorporation of the compounds of formulae I and II or Ia, Ib and II and further optional additives into the materials can be carried out by conventional technological methods, typically by admixture or application. In the case of polymers, in particular of synthetic polymers, the incorporation can be carried out before or during shaping or also by applying the dissolved or dispersed compounds to the polymers, if necessary with subsequent evaporation of the solvent. Elastomers can also be stabilised as latices. The compounds of formulae I and II or Ia, Ib and II can also be incorporated into polymers by being added before or immediately after the polymerisation of the corresponding monomers or before crosslinking. The compounds of formulae I and II or Ia, Ib and II can be added as such or also in encapsulated form (e.g. in waxes, oils or polymers). Where the addition is carried out before or during the polymerisation, the compounds of formulae I and II or Ia, Ib and II can also serve as regulators for the chain length of the polymers (chain terminators). The compounds of formulae I and II or Ia, Ib and II can also be added to the plastic materials to be stabilised in the form of a masterbatch comprising said compounds in a concentration of, for example, 2.5 to 25% by weight.

The incorporation of the compounds of formulae I and II or Ia, Ib and II can conveniently be carried out by the following methods:

as emulsion or dispersion (e.g. to latices or emulsion polymers), as dry mixture during the admixture of additional components, or as polymer mixtures, by direct addition to the processing apparatus (e.g. extruder, closed mixer, and the like), as solution or melt.

The polymer compositions of this invention can be used in different form or processed to different products, typically films, fibres, ribbons, mouldings, profiles, or binders for paint systems, adhesives or putties.

In addition to the compounds of formulae I and II or Ia, Ib and II, the novel mixtures or compositions can comprise as additional component C one or several customary additives such as the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4- dioctylthiomethyl-6-methylphenol, 2,4-dioctylthiomethyl-6-ethylphenol, 2,6-di-dodecylthio-methyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl) disulfide.

1.6. Alkylidenebisphenols, for example 2,2'-methylenebis (6-tert-butyl-4-methylphenol), 2,2'-methylenebis (6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methylphenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl) isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)-oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis (3,5-di-tert-butyl-4-hydroxyphenylpropionyl) trimethylenediamine, N,N'-bis(3,5-di-tert-butyl-4-hydroxyphenylpropionyl)-hydrazine.

1.18. Ascorbic acid (vitamin C)

1.19. Aminic antioxidants, for example N,N'-di-isopropyl-p-phenylenediamine, N,N'-di-sec-butyl-p- phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, for example p,p'-di-tert-octyidiphenylamine, 4-n-butylaminophenol, 4-butyrylaminophenol, 4-nonanoylamino-phenol, 4-dodecanoyl-aminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N', N'-tetramethyl-4,4'-diaminodiphenylmethane, 1,2-bis[(2-methylphenyl)amino]ethane, 1,2-bis(phenylamino) propane, (o-tolyl)biguanide, Bis[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyidiphenylamines, a mixture of mono- and dialkylated isopropyl/isohexyldiphenylamines, a mixture of mono- und dialkylated tert-butyidiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol300;, where R=3'-tert-butyl-4'-hydroxy-5'-2H-benzotriazol-2-ylphenyl.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis (4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-di-phenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetra-methylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3, 5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl) hexamethylenediamine and 4-tert-octylamino-2,6-di-chloro-1,3,5-triazine, tris(2,2,6,6-tetramethyl-4-piperidyl) nitrilotriacetate, tetrakis(2,2,6,6-tetramethyl-4-piperidyl)-1, 2,3,4-butane-tetracarboxylate, 1,1'-(1,2-ethanediyl)bis(3,3, 5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2, 4-dion, bis(1-octyloxy-2,2,6,6-tetramethylpiperidyl) sebacate, bis(1-octyloxy-2,2,6,6-tetramethyl-piperidyl) succinate, the condensate of N,N'-bis-(2,2,6,6-tetramethyl-4-piperidyl)hexamethylenediamine and 4-morpholino-2,6-dichloro-1,3,5-triazine, the condensate of 2-chloro-4,6-bis (4-n-butylamino-2,2,6,6-tetramethylpiperidyl)-1,3,5-triazine and 1,2-bis(3-aminopropyl-amino)ethane, the condensate of 2-chloro-4,6-di-(4-n-butylamino-1,2,2,6,6-pentamethyl-piperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2, 5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl) hexamethylenediamine and 4-cyclohexylamino-2,6- dichloro-1,3,5-triazine, a condensation product of 1,2-bis(3-amino-propylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro [4,5]decane und epichlorohydrin.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and paramethoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-di-benz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methylphosphite, bis(2,4-di-tert-butyl-6-methylphenyl) ethylphosphite.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkyl-hydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or tin pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers ("ionomers").

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863, U.S. Pat. No. 4,338,244, U.S. Pat. No. 5,175,312, U.S. Pat. No. 5,216,052, U.S. Pat. No. 5,252,643, DE-A- 4316611, DE-A-4316622, DE-A-4316876, EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

As additional component C, useful mixtures or compositions of this invention comprise at least one thiosynergist and/or at least one phosphite or phosphonite and/or at least one aminic antioxidant.

Illustrative examples of thiosynergists are dilauryl thiodipropionate or distearyl thiodipropionate, and illustrative examples of phosphites or phosphonites are triphenylphosphite, diphenylalkylphosphites, phenyldialkylphosphites, tris(nonylphenyl)phosphite, trilaurylphosphite, trioctadecylphosphite, distearylpentaerythritoldiphosphite, tris(2,4-di-tert-butyl-phenyl)phosphite, diisodecylpentaerythritoldiphosphite, bis(2,4di-tert-butylphenyl)pentaerythritoldiphosphite, bis(2,6-di-tert-butyl-4-methylphenyl)pentaerythritoldiphosphite, bisisodecyloxypentaerythritoldiphosphite, bis(2,4di-tert-butyl-6-methylphenyl)pentaerythritoldiphosphite, bis(2,4,6-tri-tert-butylphenyl)pentaerythritoldiphosphite, tristearylsorbitoltriphosphite, tetrakis(2,4-di-tert-butylphenyl)-4,4'-biphenylenediphosphonite, 6-isooctyloxy-2,4,8,10-tetra-tert-butyl-12H-dibenz[d,g]-1,3,2-dioxaphosphocin, 6-fluoro-2,4,8,10-tetratertbutyl-12-methyl-dibenz[d,g]-1,3,2-dioxaphosphocin, bis(2,4-di-tert-butyl-6-methylphenyl)-methylphosphite, bis(2,4-di-tert-butyl-6-methylphenyl)ethylphosphite.

Suitable aminic antioxidants are preferably those of formula Ar—NH—Ar', wherein Ar and Ar' are each independently of the other a radical of formula

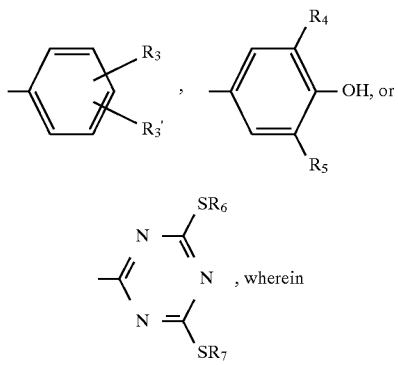

$R_3$ and $R_3'$ are each independently of the other H or $C_4$–$C_{18}$alkyl, $R_4$ and $R_5$ are each independently of the other $C_1$–$C_4$alkyl, and $R_6$ and $R_7$ are each independently of the other $C_4$–$C_{18}$alkyl.

The aminic antioxidants mentioned above under 1.19. are particularly suitable. Mixtures with an aminic antioxidant play a decisive part in stabilising polyols which are susceptible to oxidation and/or in preventing the so-called core discoloration/scorching in the preparation of polyurethanes or polyurethane foams.

The individual components of the novel stabiliser mixture are known and some are commercially available. They can be prepared in general accordance with known processes, as disclosed, inter alia, in U.S. Pat. No. 5,098,945.

These additional additives are conveniently used in amounts of 0.1–10, typically of 0.2–5% by weight, based on the organic material to be stabilised.

The following Examples illustrate the invention in more detail. In the Examples as well as in the patent claims, all parts and percentages are by weight, unless otherwise stated. The following abbreviations are used in the Examples:

| ABS | acrylonitrile/butadiene/styrene |
|---|---|
| BHT | 2,6-di-tert-butyl-4-methylphenol [butylhydroxytoluene] |
| DSC | differential scanning calorimeter |
| ® Irganox 245 | triethylene glycol bis[3-(3',5'-di-tert-butyl-4-hydroxyphenyl)propionate] |
| ® Irganox 1076 | stearyl-β-(3,5-di-tert-butyl-4-hydroxyphenyl)propionate |
| Ic | 2,4-dimethyl-6-(1-methylpentadecyl)phenol |
| Id | 2,4-dimethyl-6-(2-ethyltetradecyl)phenol |

Stabilisation of ABS 100 parts of the stabilisers cited in Table 1 and 10 parts of stearic acid are fused at 80° C. With vigorous stirring, 2 parts of potassium hydroxide, dissolved in 200 parts of water, are added in increments. A calculated amount of the resulting emulsion is added to the ABS latex.

200 g of ABS latex (33% solids content) are added in increments at 60° C. to a coagulating solution consisting of 7.2 g of $MgSO_4.7 H_2O$ and 300 g of water, the pH of which is adjusted to 4 with acetic acid. The slurry so obtained is heated for 5 minutes to 90° C., filtered and the filter product is washed in increments with 600 g of water. The moist ABS particles so obtained are dried over 15 hours at 60° C. under vacuum (c. 150 mbar).

The thermal stability of the ABS powder so obtained is then determined with a DSC apparatus under oxygen atmosphere. The time until the maximum of the exothermic reaction at 180° C. is reached is determined. The exothermic reaction which occurs is a measure of the degradation of the polymer. The stabilisation criterion is the time until the exothermic reaction starts or reaches its maximum. The heating pattern obtained shows a better stabilisation of the polymer with the stabiliser mixture in comparison to that of the individual components.

TABLE 1

| No. | Stabiliser | % in ABS |
|---|---|---|
| 1 | Ic/Id | 0.30 |
| 2 | Ic/Id | 0.50 |
| 3 | Irganox 1076 | 0.30 |
| 4 | Ic/Id | 0.15 |
|   | Irganox 1076 | 0.15 |
| 5 | Irganox 1076 | 0.50 |
| 6 | Ic/Id | 0.25 |
|   | Irganox 1076 | 0.25 |
| 7 | Irganox 245 | 0.30 |
| 8 | Ic/Id | 0.15 |
|   | Irganox 245 | 0.15 |
| 9 | Irganox 245 | 0.50 |
| 10 | Ic/Id | 0.25 |
|   | Irganox 245 | 0.25 |
| 11 | BHT | 0.30 |
| 12 | Ic/Id | 0.15 |
|   | BHT | 0.15 |
| 13 | BHT | 0.50 |
| 14 | Ic/Id | 0.25 |
|   | BHT | 0.25 |

We claim:

1. A mixture, comprising a) at least one compound of formula I

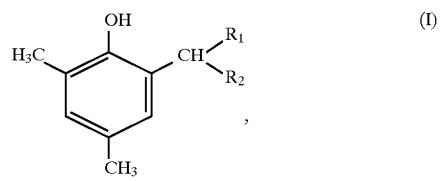

wherein $R_1$ is methyl or ethyl, and $R_2$ is $C_{10}$–$C_{30}$alkyl, and b) at least one compound of formula II

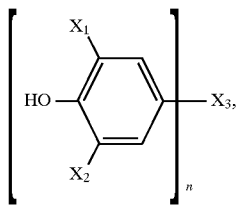
(II)

wherein n is 1, 2 or 4, $X_1$ is tert-butyl, $X_2$ is $C_1$–$C_4$alkyl, $X_3$, where n=1, is $C_1$–$C_{20}$alkyl, a triazinylamino group which is substituted at the triazine ring by $C_1$–$C_{10}$alkylthio, or a —$A_1$—COO—$A_2$ or —$A_1$—CONH—$A_2$ group,
wherein $A_1$ is either a direct bond or $C_1$–$C_4$alkylene, and $A_2$ is $C_1$–$C_{20}$alkyl; $C_4$–$C_{20}$alkyl which is interrupted by —O—; $C_5$–$C_{12}$cycloalkyl; phenyl; phenyl which is substituted by —OH and/or $C_1$–$C_4$alkyl; $C_7$–$C_9$phenylalkyl; $C_7$–$C_9$phenylalkyl which is substituted at the phenyl moiety by —OH and/or $C_1$–$C_4$alkyl, $X_3$, where n=2, is a —$E_1$—COO—$E_2$—OOC—$E_3$— or —$E_1$—CONH—$E_2$—NHCO—$E_3$— group,
wherein $E_1$ and $E_3$ are each independently of the other a direct bond or $C_1$–$C_4$alkylene, $E_2$ is $C_2$–$C_{20}$alkylene; $C_4$–$C_{20}$alkylene which is interrupted by —O— or —S—; a

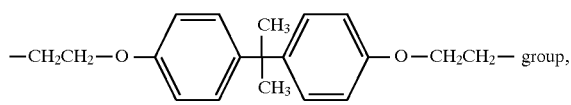

$C_5$–$C_7$cycloalkylene; $C_1$–$C_4$alkyl-substituted $C_5$–$C_7$cycloalkylene, phenylene or a

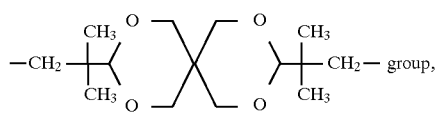

or $X_3$, where n=4, is [—$G_1$—COO]$_4$—$G_2$,
wherein $G_1$ is a direct bond or $C_1$–$C_4$alkylene, and $G_2$ is $C_5$–$C_{10}$alkanetetrayl.

2. A mixture according to claim 1, comprising a) a mixture of the compounds Ia and Ib,

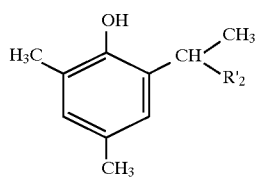
(Ia)

-continued

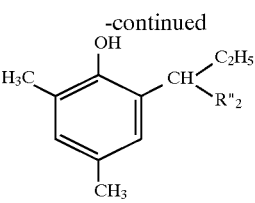
(Ib)

wherein $R_2'$ is —$C_mH_{2m+1}$, and $R_2''$ is —$C_{m-1}H_{2m-1}$, and m is an integer from 10 to 30 and is identical in $R_2'$ and $R_2''$, and b) at least a compound of formula II

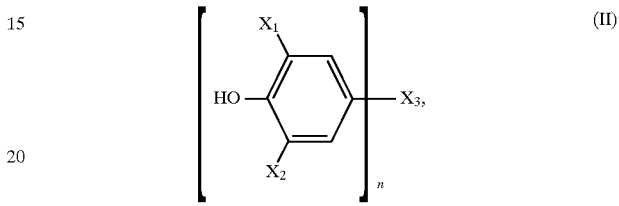
(II)

wherein n is 1, 2 or 4, $X_1$ is tert-butyl, $X_2$ is $C_1$–$C_4$alkyl, $X_3$, where n=1, is $C_1$–$C_{10}$alkyl, a triazinylamino group which is substituted at the triazine ring by $C_1$–$C_{10}$alkylthio, or a —$A_1$—COO—$A_2$ group,
wherein $A_1$ is $C_1$–$C_4$alkylene, and $A_2$ is $C_1$–$C_{20}$alkyl, $X_3$, where n=2, is a —$E_1$—COO—$E_2$—OOC—$E_3$— group,
wherein $E_1$ and $E_3$ are $C_1$–$C_4$alkylene, $E_2$ is $C_2$–$C_{20}$alkylene; $C_4$–$C_{20}$alkylene which is interrupted by —O— or —S—, or a

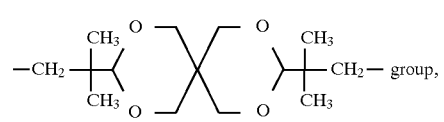

or $X_3$, where n=4, is [—$G_1$—COO]$_4$—$G_2$,
wherein $G_1$ is $C_1$–$C_4$alkylene, and $G_2$ is $C_5$–$C_{10}$alkanetetrayl.

3. A mixture according to claim 1, comprising a) a mixture of the compounds

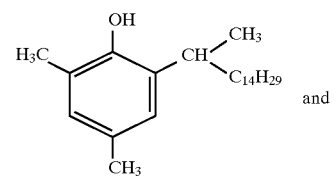
(Ic)

and

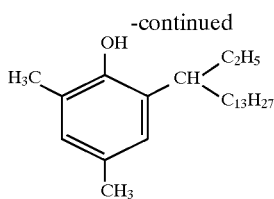

4. A mixture according to claim 1, wherein $X_3$, where n=1, is $C_1$–$C_4$alkyl or a —$A_1$—COO—$A_2$ group, wherein $A_1$ is $C_2$alkylene, and $A_2$ is $C_{10}$–$C_{20}$alkyl, or $X_3$, where n=2, is a —$E_1$—COO—$E_2$—OOC—$E_3$— group, wherein $E_1$ and $E_3$ are $C_2$alkylene, and $E_2$ is $C_6$alkylene which is interrupted by —O—, or $X_3$, where n=4, is [—$G_1$—COO]$_4$—$G_2$, wherein $G_1$ is $C_2$alkylene, and $G_2$ is $C_5$alkanetetrayl.

5. A mixture according to claim 1, comprising a) a mixture of the compounds

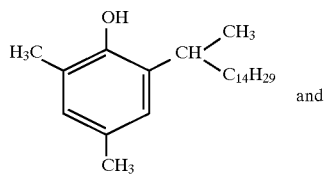

and

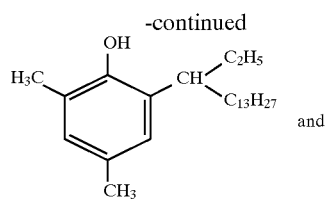

and b) at least one compound of formula II $$\left[ \begin{array}{c} X_1 \\ HO \phantom{XXX} X_3 \\ X_2 \end{array} \right]_n \quad (II)$$

wherein n=1, $X_1$ and $X_2$ are tert-butyl, and $X_3$ is a —$A_1$—COO—$A_2$ group, wherein $A_1$ is $C_2$alkylene, and $A_2$ is $C_{18}$alkyl.

6. A mixture according to claim 1, wherein $X_1$ and $X_2$ are tert-butyl.

7. A mixture according to claim 1, which additionally comprises at least one additional stabiliser.

8. A mixture according to claim 7, wherein the additional stabiliser is an aminic antioxidant.

9. A mixture according to claim 7, wherein the additional stabiliser is a thiosynergist and/or a phosphite.

* * * * *